United States Patent [19]

Afsar et al.

[11] Patent Number: 5,765,215
[45] Date of Patent: Jun. 9, 1998

[54] METHOD AND SYSTEM FOR EFFICIENT RENAME BUFFER DEALLOCATION WITHIN A PROCESSOR

[75] Inventors: Muhammad Afsar; Soummya Mallick; Rajesh B. Patel, all of Austin, Tex.

[73] Assignees: International Business Machines Corporation, Armonk, N.Y.; Motorola, Inc., Schaumburg, Ill.

[21] Appl. No.: 519,556

[22] Filed: Aug. 25, 1995

[51] Int. Cl.⁶ .................. G06F 9/26; G06F 12/02
[52] U.S. Cl. .................. 711/214; 711/4; 711/220; 395/376; 395/377; 395/391; 395/394
[58] Field of Search .................. 395/377, 376, 395/379, 200.01, 421.1, 497.01, 404, 394, 391; 711/220, 4, 214

[56] References Cited

U.S. PATENT DOCUMENTS

| | | | |
|---|---|---|---|
| 4,785,395 | 11/1988 | Keeley | 395/449 |
| 4,855,904 | 8/1989 | Daberkow et al. | 395/394 |
| 4,901,233 | 2/1990 | Liptay | 395/394 |
| 4,903,196 | 2/1990 | Pomerene et al. | 395/393 |
| 4,980,819 | 12/1990 | Cushing et al. | 395/800.3 |
| 5,261,062 | 11/1993 | Sato | 395/705 |
| 5,261,071 | 11/1993 | Lyon | 711/140 |
| 5,355,457 | 10/1994 | Shebanow et al. | 395/394 |
| 5,367,651 | 11/1994 | Smith et al. | 395/709 |
| 5,524,224 | 6/1996 | Denman et al. | 395/375 |
| 5,559,976 | 9/1996 | Song | 395/375 |

*Primary Examiner*—Eddie P. Chan
*Assistant Examiner*—Than V. Nguyen
*Attorney, Agent, or Firm*—Casimer K. Salys; Brian F. Russell; Andrew J. Dillon

[57] ABSTRACT

A method and system are disclosed for managing the deallocation of a rename buffer allocated to an update instruction within a processor. The processor has a number of rename buffers for temporarily storing information associated with instructions executed by the processor, a number of registers, and a memory. According to the present invention, an update instruction is dispatched to the processor for execution. A particular rename buffer is then allocated to the update instruction. An effective address is generated for the update instruction, wherein the effective address specifies an address within the memory to be accessed by the update instruction. Next, the effective address is stored within the particular rename buffer. Prior to completion of the access to the effective address within memory, the effective address is transferred from the particular rename buffer to a particular one of the number of registers. Thereafter, the particular rename buffer is deallocated, wherein processor performance is enhanced by improved rename buffer availability.

12 Claims, 3 Drawing Sheets

METHOD AND SYSTEM FOR EFFICIENT RENAME BUFFER DEALLOCATION WITHIN A PROCESSOR

BACKGROUND OF THE INVENTION

1. Technical Field

The present invention relates in general to a method and system for data processing and in particular to a method and system for managing resource allocation within a processor. Still more particularly, the present invention relates to a method and system for managing the deallocation of rename buffers allocated to update instructions executed by a processor.

2. Description of the Related Art

A typical high-performance processor includes an instruction cache for storing instructions, an instruction buffer for temporarily storing instructions fetched from the instruction cache for execution, a number of execution units for executing instructions, a dispatch unit for dispatching instructions from the instruction buffer to particular ones of the execution units, and a completion buffer for temporarily storing instructions that have finished execution, but have not been completed. In addition, the processor has a number of rename buffers which temporarily store data associated with instructions executed by the processor and architected registers which store data results of completed instructions. As is well-known to those skilled in the art, an instruction is completed by transferring data from a rename buffer associated with the instruction to an architected register.

Rename buffers are typically allocated to instructions at dispatch and deallocated following completion. Since the processor has a limited number of rename buffers, performance problems arise when fewer rename buffers are available than are required by the next set of instructions to be dispatched. If rename buffers are unavailable, dispatch of instructions is halted and the processor's pipeline of execution stalls. The availability of rename buffers is particularly problematical when the processor executes one or more load-with-update instructions, which each require two rename buffers—one for the effective address of the instruction and a second for the data loaded from the effective address.

Consequently, it would be desirable to provide an improved method and system for managing resource allocation within a processor. In particular, it would be desirable to provide a method and system within a processor for managing the deallocation of rename buffers allocated to update instructions.

SUMMARY OF THE INVENTION

It is therefore one object of the present invention to provide an improved method and system for data processing.

It is another object of the present invention to provide an improved method and system for managing resource allocation within a processor.

It is yet another object of the present invention to provide an improved method and system for managing the deallocation of rename buffers allocated to update instructions executed by a processor.

The foregoing objects are achieved as is now described. A method and system are disclosed for managing the deallocation of a rename buffer allocated to an update instruction within a processor. The processsor has a number of rename buffers for temporarily storing information associated with instructions executed by the processor, a number of registers, and a memory. According to the present invention, an update instruction is dispatched to the processor for execution. A particular rename buffer is then allocated to the update instruction. An effective address is generated for the update instruction, wherein the effective address specifies an address within the memory to be accessed by the update instruction. Next, the effective address is stored within the particular rename buffer. Prior to completion of the access to the effective address within memory, the effective address is transferred from the particular rename buffer to a particular one of the number of registers. Thereafter, the particular rename buffer is deallocated, wherein processor performance is enhanced by improved rename buffer availability.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
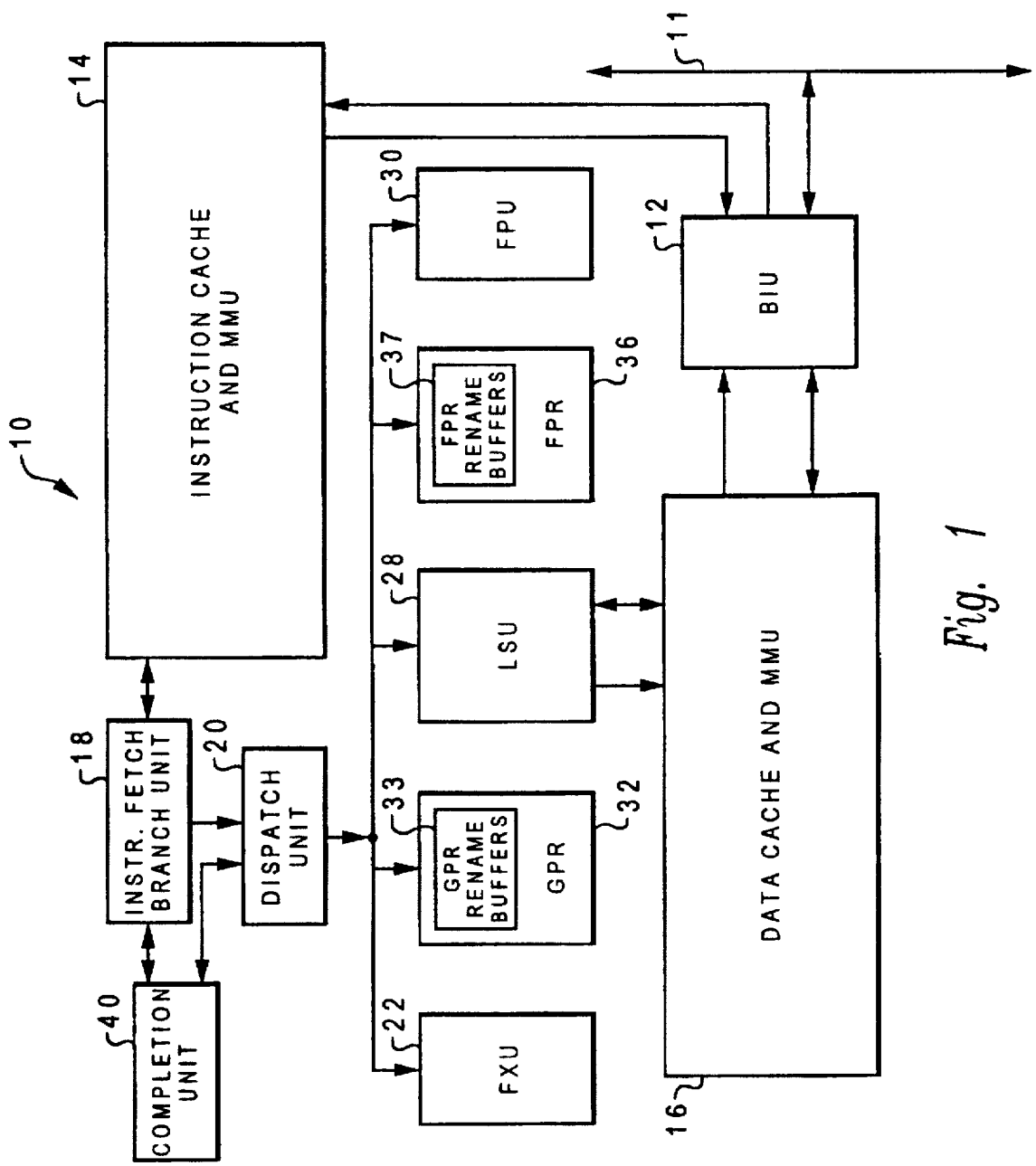
FIG. 1 illustrates a block diagram of a processor which employs the method and system of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 included various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices within a host data processing system that are coupled to system bus 11, such as a main memory (not illustrated).

BIU 12 is connected to instruction cache 14 and data cache 16 within processor 10. High speed caches, such as instruction cache 14 and data cache 16 enable processor 10 to achieve relatively fast access time to a subset of data or instructions previously transferred from main memory to caches 14 and 16, thus improving the speed of operation of the host data processing system. Instruction cache 14 is further coupled to instruction fetch/branch unit 18, which fetches instructions from instruction cache 14 during each cycle for execution. Instruction fetch/branch unit 18 executes branch instructions retrieved from instruction cache 14, but transmits sequential instructions to other execution circuitry within processor 10 for execution.

In the depicted embodiment, in addition to instruction fetch/branch unit 18, the execution circuitry of processor 10 comprises multiple execution units, including fixed-point unit (FXU) 22, load/store unit (LSU) 28, and floating-point unit (FPU) 30. As is well-known to those skilled in the computer arts, each execution unit executes one or more instructions of a particular class of sequential instructions during each processor cycle. For example, FXU 22 performs fixed-point mathematical operations, such as addition, subtraction, ANDing, ORing, and XORing, on source operands received from specified general purpose registers (GPRs) 32. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36. FPU 30 outputs data resulting from the execution of a floating-point instruction to selected FPR rename buffers 37, which temporarily store the result data until the instruction is completed by transferring the result data from FPR rename buffers 37 to selected FPRs 36. As its name implies, LSU 28 executes floating-point and fixed-point instructions which either load data from memory (i.e., either data cache 16 or main memory) into selected GPRs 32 or FPRs 36 or which store data from selected GPRs 32 or FPRs 36 to memory.

Processor 10 employs both pipelining and out-of-order execution of instructions to further improve the performance of its superscalar architecture. Accordingly, instructions can be executed by instruction fetch/branch unit 18, FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, an instruction is processed by execution units 22, 28, and 30 at five distinct stages, namely, fetch, decode/dispatch, execute, finish, and completion.

At the fetch stage, instruction fetch/branch unit 18 fetches one or more instructions associated with one or more memory addresses from instruction cache 14. As mentioned above, instruction fetch/branch unit 18 removes branch instructions from the instruction stream and executes them itself. Conditional branch instructions which cannot be resolved are executed speculatively by predicting whether or not the branch will be taken. Sequential instructions, on the other hand, are forwarded by instruction fetch/branch unit 18 to dispatch unit 20.

During the decode/dispatch stage, dispatch unit 20 decodes and dispatches one or more instructions to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution by means of unique instruction identifiers.

During the execute stage, execution units 22, 28, and 30, execute instructions received from dispatch unit 20 as soon as the source operands for the indicated operations are available. After execution has finished, execution units 22, 28, and 30 store data results within either GPR rename buffers 33 or FPR rename buffers 37, depending upon the instruction type. Then, execution units 22, 28, and 30 signal completion unit 40 that the execution unit has finished an instruction. Finally, instructions are completed in program order by transferring result data from GPR rename buffers 33 or FPR rename buffers 37 to GPRs 32 or FPRs 36, respectively. In general, the rename buffer allocated to an instruction is deallocated following completion of the instruction; however, as described below, the present invention permits the deallocation of a rename buffer allocated to an update instruction prior to completion of the update instruction, thereby enhancing processor performance (and preventing processor stalls) by promoting greater resource availability.

Figure 2:
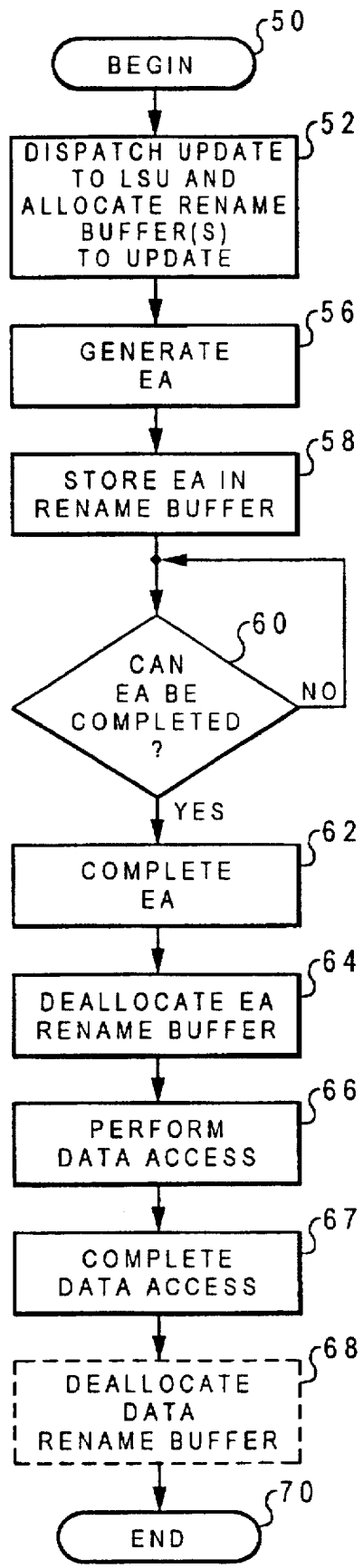
FIG. 2 is a flowchart depicting the allocation and deallocation of rename buffers to an update instruction according to the method and system of the present invention.

Referring now to FIG. 2, there is depicted a flowchart of the method utilized by the present invention to allocate and deallocate rename buffers to update instructions executed by the processor illustrated in FIG. 1. As depicted, the process begins at block 50 when an update instruction is fetched by instruction fetch/branch unit 18 from instruction cache 14. As described above, the update instruction, which may be either a load-with-update or store-with-update, is then passed from instruction fetch/branch unit 18 to dispatch unit 20. Next, the process proceeds to block 52, which illustrates dispatch unit 20 dispatching the update instruction to LSU 28 for execution. According to a preferred embodiment of the present invention, dispatch unit 20 assigns two instruction identifiers to the update instruction, one associated with the generation of the effective address and a second associated with a data access (a load or store). As described below, assigning two instruction identifiers to the update instruction enables the effective address generation and data access portions of the update instruction to be completed independently. Upon dispatch of the update instruction, dispatch unit 20 also allocates a GPR rename buffer 33 to the update instruction to provide temporary storage for the effective address. If the update is a load-with-update, dispatch unit 20 allocates an additional GPR rename buffer 33 to store the data loaded from the effective address within memory.

Figure 3:
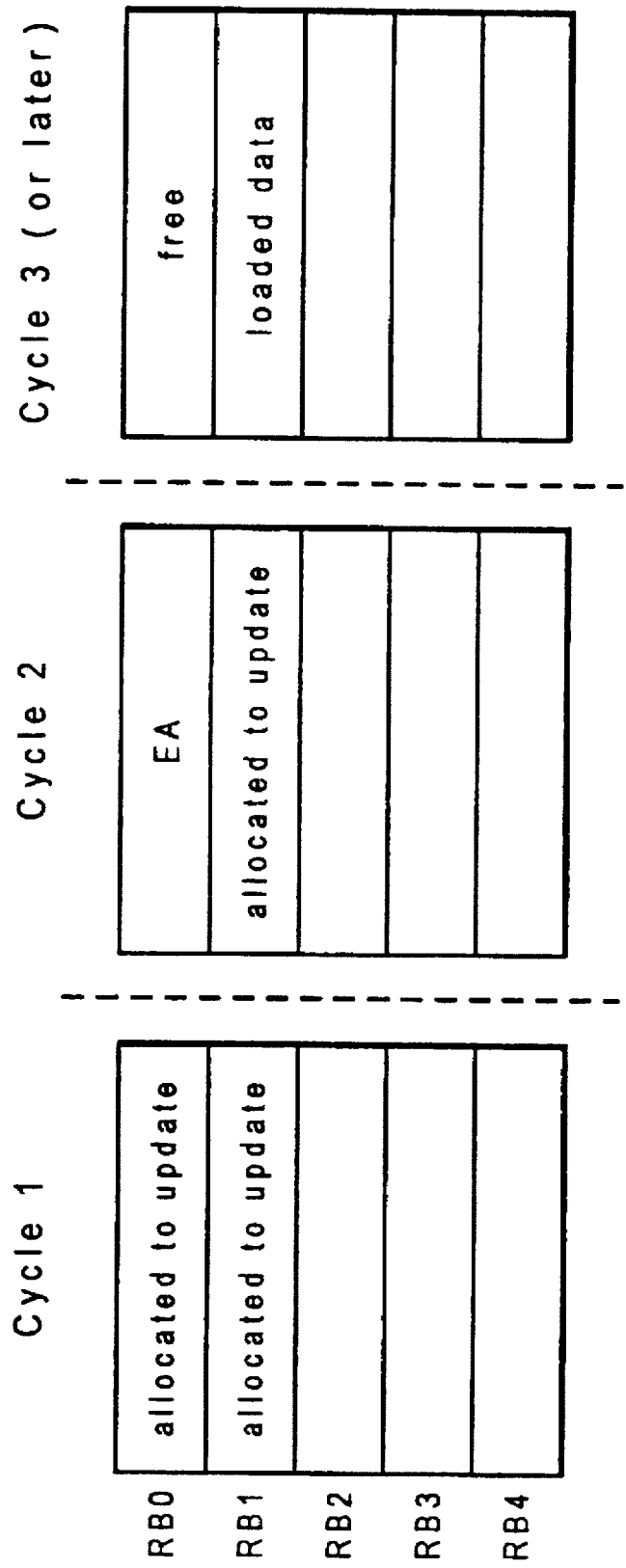
FIG. 3 is a timing diagram illustrating the allocation and deallocation of rename buffers to an update instruction according to the method and system of the present invention.

With reference now to FIG. 3, there is illustrated a block diagram of GPR rename buffers 33 during the execution of the update instruction. In the depicted embodiment, GPR rename buffers 33 comprise rename buffers RB0-RB4, two of which are allocated to a load-with-update instruction by dispatch unit 20 upon dispatch (cycle 1).

Returning to FIG. 2, the process proceeds from block 52 to block 56, which illustrates LSU 28 calculating the effective address (EA) of the update instruction from operands stored within specified GPRs 32. The process then proceeds to block 58, which depicts storing the EA within one of the rename buffers allocated to the update instruction (i.e., finishing the address generation portion of the update instruction). Following the finish of the address generation portion of the update instruction, the instruction identifer assigned to the address generation portion of the update instruction is passed to completion unit 40. The process then proceeds from block 58 to block 60, which depicts completion unit 40 determining whether the address portion of the update instruction can be completed. As described above, the depicted embodiment of processor 10 completes instructions according to program order. Thus, the address generation portion of the update instruction can only be completed if the update instruction is the oldest uncompleted instruction within the completion buffer of completion unit 40. However, in other more sophisticated embodiments of the present invention which support out-of-order completion, the address generation portion of the update instruction can be completed if certain conditions are satisfied. For example, the address generation portion of the update instruction can be completed out of program order if uncompleted instructions which precede the update instruction in program order will not cause exceptions, the update instruction is not within a speculative execution stream, and handling of external interrupts received by processor 10 can be delayed until the current instruction register maintained by completion unit 40 is set to the update instruction. If the conditions required for completion are not satisfied, the process returns to block 60. However, if the address generation portion of the update instruction can be completed, the process proceeds to block 62, which illustrates completion unit 40 completing the address generation portion of the update instruction by transferring the effective address from the GPR rename buffer 33 to one of GPRs 32. Then, as depicted at block 64, dispatch unit 20 deallocates the rename buffer allocated to the address generation portion of the update instruction.

Referring again to FIG. 3, the events depicted in blocks 56–64 of FIG. 2 are illustrated at cycle 2. As depicted, the EA is stored in rename buffer RB0 following the calculation of the EA by LSU 28. At the end of cycle 2, the address generation portion of the update instruction is completed and rename buffer RB0 is deallocated. It is important to note that the second rename buffer allocated to the update instruction, rename buffer RB1, has not yet been utilized since the effective address generated at cycle 2 specifies the address within memory to be accessed by LSU 28.

Returning to FIG. 2, the process proceeds from block 64 to block 66, which illustrates performing the data access specified by the update instruction. Thus, if the update instruction is a load-with-update, LSU 28 requests the data within the EA from data cache 16, or if a cache miss occurs, main memory. Alternatively, if the update instruction is a store-with-update, LSU 28 enqueues a store to the EA within an internal store queue. The return of the requested data from memory or the enqueuing of the store request constitutes finishing the data access portion of the update instruction. Upon finishing the data access portion of the update instruction, LSU 28 forwards the instruction identifier associated with the data access portion of the update instruction to completion unit 40. Thereafter, the process proceeds to block 67, which depicts completion unit 40 completing the data access portion of the update instruction either by transferring the retrieved data from the second rename buffer to one of GPRs 32 or by dequeuing the store operation and transmitting the specified data to memory. The process proceeds from block 67 to block 68, which illustrates dispatch unit 20 deallocating the second rename buffer allocated to the update instruction. As will be appreciated by those skilled in the art, the step depicted at block 68 is only performed if the update instruction is a load-with-update. Thereafter, the process terminates at block 70.

Referring again to FIG. 3, the events depicted at blocks 66–68 of FIG. 2 are illustrated at cycle 3. As is shown, rename buffer RB0 is free to be allocated to other instructions at the beginning of cycle 3. However, rename buffer RB1 remains allocated to the update instruction and is utilized to store the data retrieved from the EA. As will be appreciated by those skilled in the art, the earliest that the load data can be returned from memory is cycle 3. However, due to cache misses and bus latencies, the load data may not be returned until cycle 4 or later. Thus, the present invention results in the deallocation of the rename buffer utilized to store the EA at least one cycle earlier than in prior art processors, thereby enhancing the performance of processors having limited rename buffer resources.

As has been described, the present invention provides an improved method and system for efficient rename buffer deallocation within a processor. By deallocating the rename buffer allocated to the effective address of the update instruction prior to completion of the data access portion of the update instruction, the present invention alleviates processor stalls due to unavailability of rename buffers.

While the invention has been particularly shown and described with reference to a preferred embodiment, it will be understood by those skilled in the art that various changes in form and detail may be made therein without departing from the spirit and scope of the invention.

What is claimed is:

1. A method for managing the deallocation of a rename buffer allocated to an update instruction within a processor, said processor having a plurality of rename buffers for temporarily storing information associated with instructions executed by said processor, a plurality of registers, and a memory, said method comprising:

dispatching an update instruction to said processor for execution, wherein execution of said update instruction includes an address calculation operation and a memory access operation;

allocating a particular rename buffer among said plurality of rename buffers to said update instruction;

performing said address calculation operation by generating an effective address that specifies a location within said memory to be accessed by said memory access operation;

storing said effective address within said particular rename buffer;

transferring said effective address from said particular rename buffer to a particular register among said plurality of registers prior to finishing said memory access operation; and deallocating said particular rename buffer prior to finishing said memory access operation, wherein processor performance is enhanced by improved rename buffer availability.

2. The method for managing the execution of an update instruction of claim 1, wherein said processor completes instructions according to a program order of said instructions, wherein said step of transferring said effective address from said particular rename buffer to said particular register is performed only if all instructions preceding said update instruction in said program order have already been completed or will be concurrently completed.

3. The method for managing the execution of an update instruction of claim 1, wherein said processor supports completion of instructions out of program order, wherein said step of transferring said effective address from said particular rename buffer to said particular register is performed immediately following storage of said effective address within said particular register on condition that uncompleted instructions preceding said update instruction in program order will not generate an interrupt, said update instruction is not executed speculatively, and external interrupts received by said processor are delayed until after instructions preceding said update instruction in said program order have been executed.

4. The method for managing the execution of an update instruction of claim 1, said method further comprising:

thereafter, completing said update instruction by storing specified data to said effective address within memory.

5. The method for managing the execution of an update instruction of claim 1, wherein said processor assigns a unique instruction identifier to each operation that can be separately completed, said method further comprising:

associating a first instruction identifier with said address generation operation and a second instruction identifier with said data access operation upon dispatching said update instruction.

6. A processor for use with a memory, said processor comprising:

a plurality of rename buffers for temporarily storing information associated with instructions executed by said processor;

a plurality of registers;

a dispatch unit for dispatching an update instruction for execution, wherein execution of said update instruction includes an address calculation operation and a memory access operation;

means for allocating a particular rename buffer among said plurality of rename buffers to said update instruction;

means for performing said address calculation operation by generating an effective address that specifies a location within said memory to be accessed by said memory access operation;

means for storing said effective address within said particular rename buffer;

means for transferring said effective address from said particular rename buffer to a particular register among said plurality of registers prior to finishing said memory access operation; and means for deallocating said particular rename buffer prior to finishing said memory access operation, wherein processor performance is enhanced by improved rename buffer availability.

7. The processor of claim 6, wherein said processor completes instructions according to a program order of said instructions, wherein said means for transferring said effective address from said particular rename buffer to said particular register is operative to complete said update instruction only if all instructions preceding said update instruction in said program order have already been completed or will be concurrently completed.

8. The processor of claim 6, wherein said processor supports completion of instructions out of program order, wherein said means for transferring said effective address from said particular rename buffer to said particular register is operative to complete said update instruction in response to storage of said effective address within said particular register on condition that uncompleted instructions preceding said update instruction in program order will not generate an interrupt, said update instruction is not executed speculatively, and external interrupts received by said processor are delayed until after instructions preceding said update instruction in said program order have been executed.

9. The processor of claim 6, said processor further comprising:

means for thereafter completing said update instruction by storing specified data within said effective address within memory.

10. The processor of claim 6, wherein said processor assigns a unique instruction identifier to each operation that can be separately completed, said processor further comprising:

means for associating a first instruction identifier with said address generation operation and a second instruction identifier with said data access operation upon dispatching said update instruction.

11. A method for managing the deallocation of a rename buffer allocated to an update instruction within a processor, said processor having a plurality of rename buffers for temporarily storing information associated with instructions executed by said processor, a plurality of registers, and a memory, said method comprising:

dispatching an update instruction to said processor for execution, wherein execution of said update instruction includes an address calculation operation and a memory access operation;

allocating a first rename buffer and a second rename buffer among said plurality of rename buffers to said update instruction;

performing said address calculation operation by generating an effective address that specifies a location within said memory to be accessed by said memory access operation;

storing said effective address within said first rename buffer;

transferring said effective address from said first rename buffer to a first register among said plurality of registers prior to completion of said memory access operation;

deallocating said first rename buffer prior to completion of said memory access operation;

performing said memory access operation by loading data at said effective address into said second rename buffer; and completing said update instruction by transferring said data from said second rename buffer to a second register among said plurality of registers.

12. A processor for use with a memory, said processor comprising:

a plurality of rename buffers for temporarily storing information associated with instructions executed by said processor, said plurality of rename buffers including a first rename buffer and a second rename buffer;

a plurality of registers including a first register and a second register;

a dispatch unit for dispatching an update instruction for execution, wherein execution of said update instruction includes an address calculation operation and a memory access operation;

means for allocating said first rename buffer and said second rename buffers to said update instruction;

means for performing said address calculation operation by generating an effective address that specifies a location within said memory to be accessed by said memory access operation;

means for storing said effective address within said first rename buffer;

means for transferring said effective address from said first rename buffer to said first register prior to completion of said memory access operation; and means for deallocating said first rename buffer prior to completion of said memory access operation;

means for performing said memory access operation by loading data at said effective address in memory into said second rename buffer; and means for completing said update instruction by transferring said data from said second rename buffer to said second register.

* * * * *